June 15, 1937. H. F. HAGEN Re. 20,408
CENTRIFUGAL FAN
Original Filed May 23, 1935 5 Sheets-Sheet 1
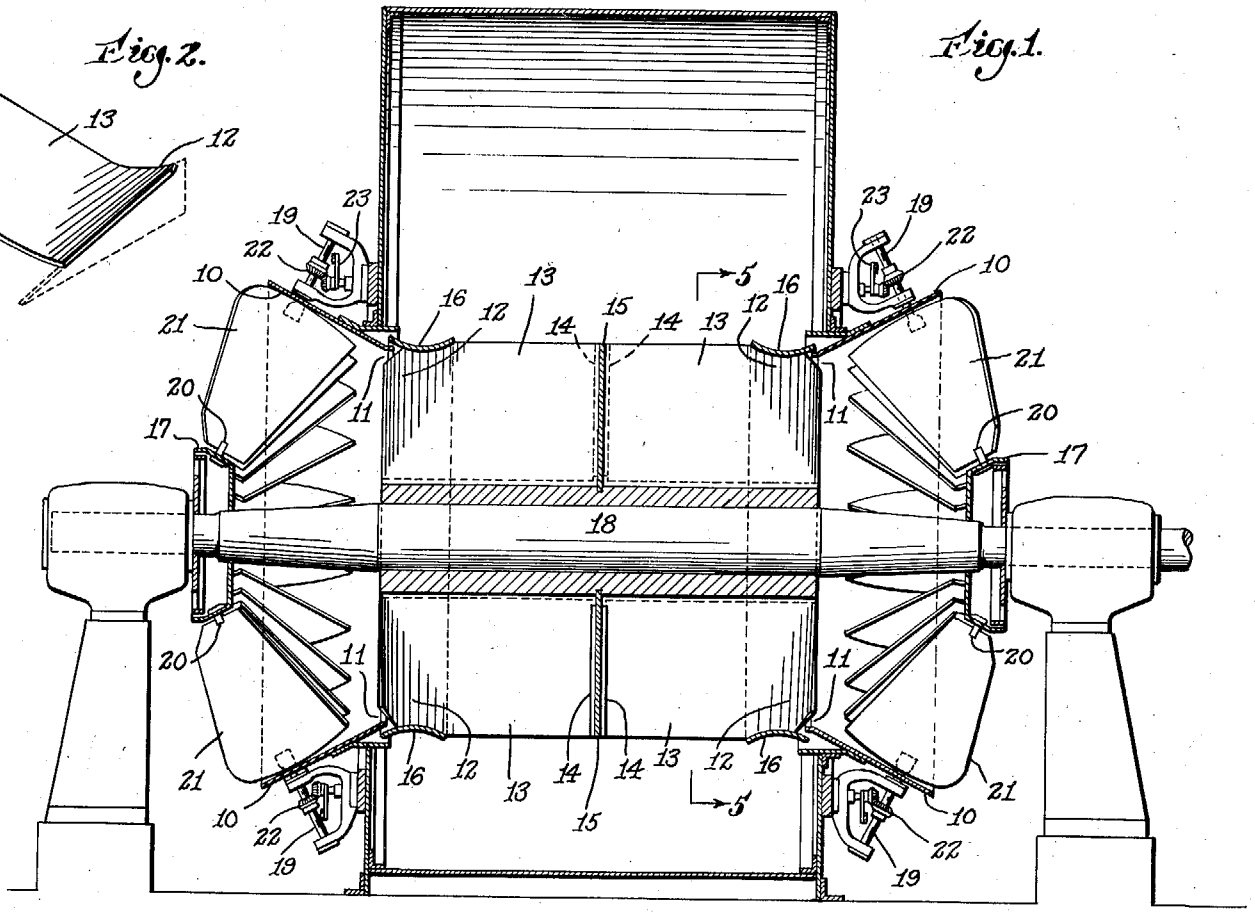
Inventor
HAROLD F. HAGEN
by Robert J. Palmer
Attorney June 15, 1937.

H. F. HAGEN

Re. 20,408

CENTRIFUGAL FAN

Original Filed May 23, 1935

5 Sheets-Sheet 2

Inventor
HAROLD F. HAGEN
by Robert T. Palmer
attorney

June 15, 1937. H. F. HAGEN Re. 20,408

CENTRIFUGAL FAN

Original Filed May 23, 1935 5 Sheets-Sheet 3

Inventor
HAROLD F. HAGEN
by Robert T. Palmer
Attorney

June 15, 1937.
H. F. HAGEN
CENTRIFUGAL FAN
Original Filed May 23, 1935
Re. 20,408
5 Sheets-Sheet 4
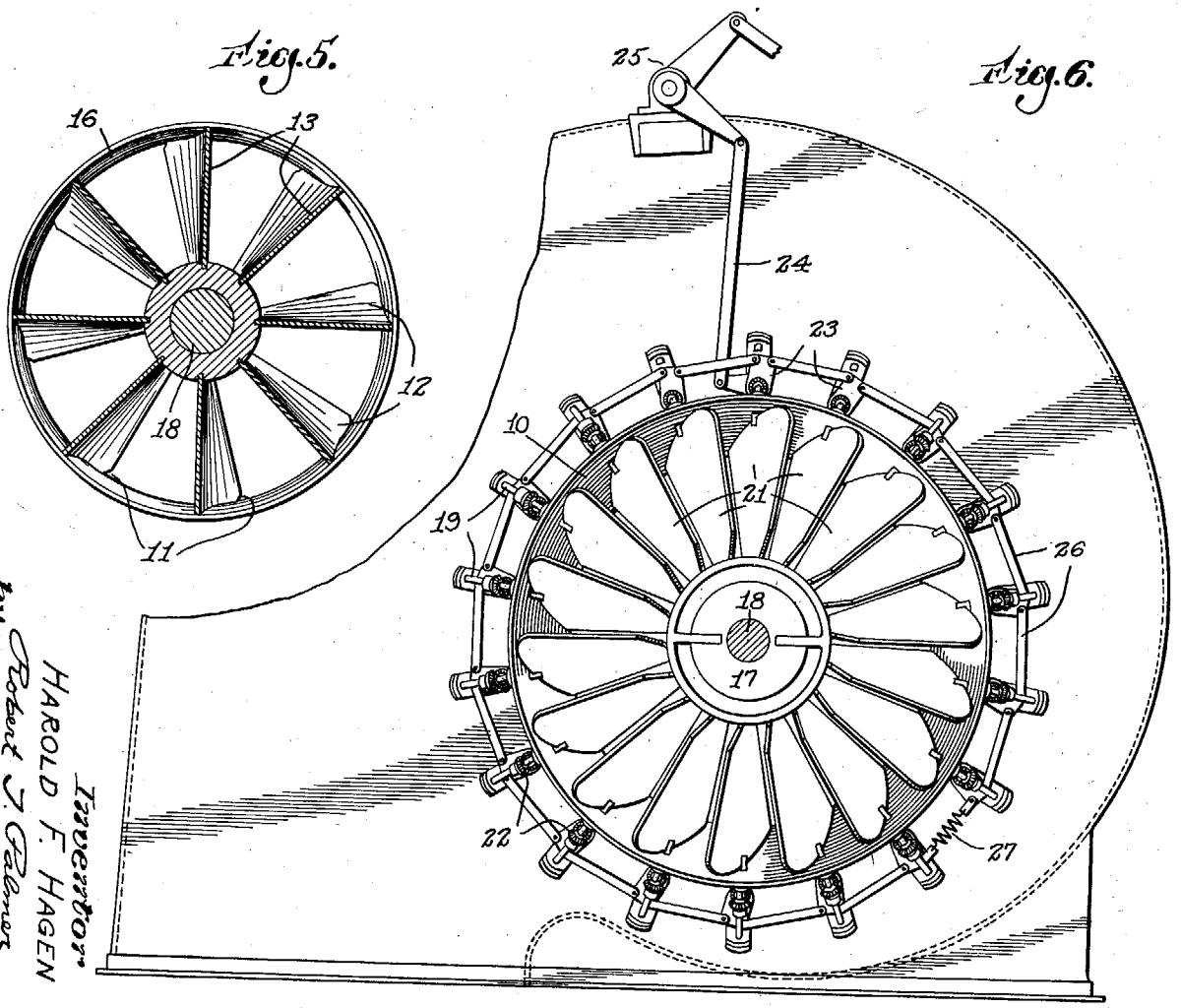
Inventor
HAROLD F. HAGEN
by Robert J. Palmer
Attorney June 15, 1937. H. F. HAGEN Re. 20,408

CENTRIFUGAL FAN

Original Filed May 23, 1935 5 Sheets-Sheet 5

Inventor
HAROLD F. HAGEN
by Robert T. Palmer
Attorney

Reissued June 15, 1937 Re. 20,408

UNITED STATES PATENT OFFICE 20,408

CENTRIFUGAL FAN

Harold F. Hagen, Dedham, Mass., assignor to B. F. Sturtevant Company, Boston, Mass.

Original No. 2,050,700, dated August 11, 1936, Serial No. 22,979, May 23, 1935. Application for reissue August 20, 1936, Serial No. 97,043

5 Claims. (Cl. 230—114)

This invention relates to centrifugal fans and relates more particularly to a fan, the volume of output of which and the driving horse power for which may be efficiently and satisfactorily adjusted without adjustment of its speed of rotation.

The motor most generally used for driving fans in power plants and other locations, is because of its efficiency and simplicity, an alternating current induction motor. The characteristics of this type of motor are such that it operates efficiently at a constant speed but the various expedients which have been suggested for varying its speed have not proved satisfactory. In power plants, for example, where fans are utilized for producing the forced draft required, it becomes necessary to vary the draft produced by the fan or fans, as the load on the plant or other conditions require it.

This invention provides a satisfactory control for the volume of output of the fan driven at constant speed for power plant and other purposes. This is accomplished by adjusting the spin velocity of the entering air at the inlet of the fan utilizing the ideas disclosed in my Patents No. 1,846,863, issued February 23, 1932 and No. 1,989,413, issued January 29, 1935. This invention is an improvement over that disclosed in my patents, in that a more efficient fan with control mechanism is provided, the adjustment being substantially proportional to the volume of output.

In my previous designs, a plurality of adjustable vanes were so placed in the converging inlet of a fan that they could be so adjusted from wide open position in which they had substantially no effect upon the movement of entering air, through an adjustment of substantially 90° to a substantially closed position where the entering air was given a spin approaching that of the fan wheel with the result the air was substantially not acted upon by the wheel and a greatly reduced delivery of the output of the fan was achieved. It was found necessary to place the vanes in a substantially conical shaped or converging inlet in order that proper control could be had. It was thought that it was required, in order that the necessary movement of air could be produced by the fan wheel, that the blades have substantially greater diameters than the converging inlet.

According to this invention, I have determined that for greatest efficiency and for proportional control, the inlet radius should approximate the delivery radius, of the wheel. The problem is really one of control of head. The adjustment sought is one of a greater range of heads. I have determined that the following formula applies:

$$\text{Head}=\frac{wr_1V_1}{g}-\frac{wr_0V_0}{g}$$

Where $w$ represents the angular velocity, $r_1$ represents the effective delivery radius of the fan wheel, $r_0$ represents effective inlet radius of the fan wheel, $V_1$ represents the spin component of the air at the discharge edge of the fan wheel, $V_0$ represents the spin component of the air entering the working portion of the fan wheel, and $g$ is the acceleration due to gravity.

Of these factors, only $V_0$ is adjustable as a control. It equals zero when the spin producing vanes are wide open and it is at its maximum, approaching infinity, when its vanes are closed. The head is, of course, maximum with the vanes wide open when $V_0$ is zero. The vanes are adjusted to partially closed positions to provide smaller heads and what is desired, of course, is as wide a range of adjustment as possible. A minimum head and wider range is secured, the nearer the two members on the right hand side of the above equation approach each other when the vanes are adjusted towards closed position. This has been accomplished according to this invention, by providing an effective inlet radius substantially that of the effective delivery radius, of the wheel so that $V_0$ and $V_1$ are substantially equal, and by approximating the spin component of the air entering the working portion of the wheel to that at the delivery edge, by providing the inlet edge of the blades of the wheel with curved inlet portions which are so shaped as to direct the entering air on to the main working portions of the fan blades with minimum difference between spin component of the entering air and of the air at the delivery edge of each blade, so that $V_0$ and $V_1$ more closely approach each other when the vanes are adjusted towards closed position.

An object of this invention is to vary the output of a constant speed fan substantially proportional to the power for driving the fan.

Another object of the invention is to provide a control mechanism for varying the output of a constant speed fan, the range of movement of the mechanism being substantially proportional to the volume of output.

Another object of the invention is to provide means having a maximum range of control for varying the output of a constant speed fan.

Other objects of the invention will be apparent from the following description taken together with the drawings.

The invention will now be described with reference to the drawings, of which:

Fig. 1 is a side sectional view of a centrifugal fan with output controls according to this invention;

Fig. 2 is a projected view of a preferred form of fan blade for use with the fan of Fig. 1;

Fig. 5 is a sectional view along the lines 5—5 of the fan wheel of Fig. 1;

Fig. 6 is a view looking into the inlet of the fan of Fig. 1;

Figure 3:
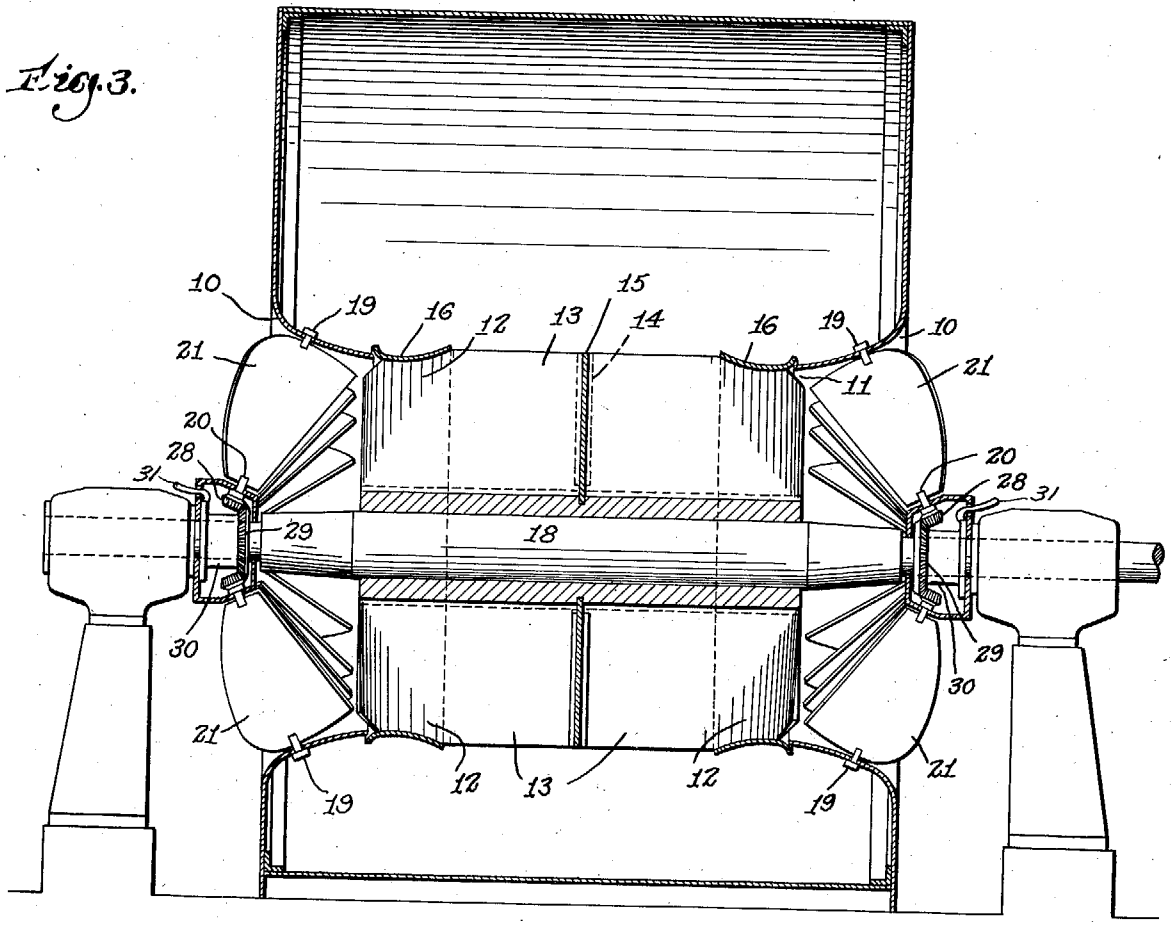
Fig. 3 is a sectional side view showing a fan with a stream-lined and venturi shaped inlet passage.
Figure 4:
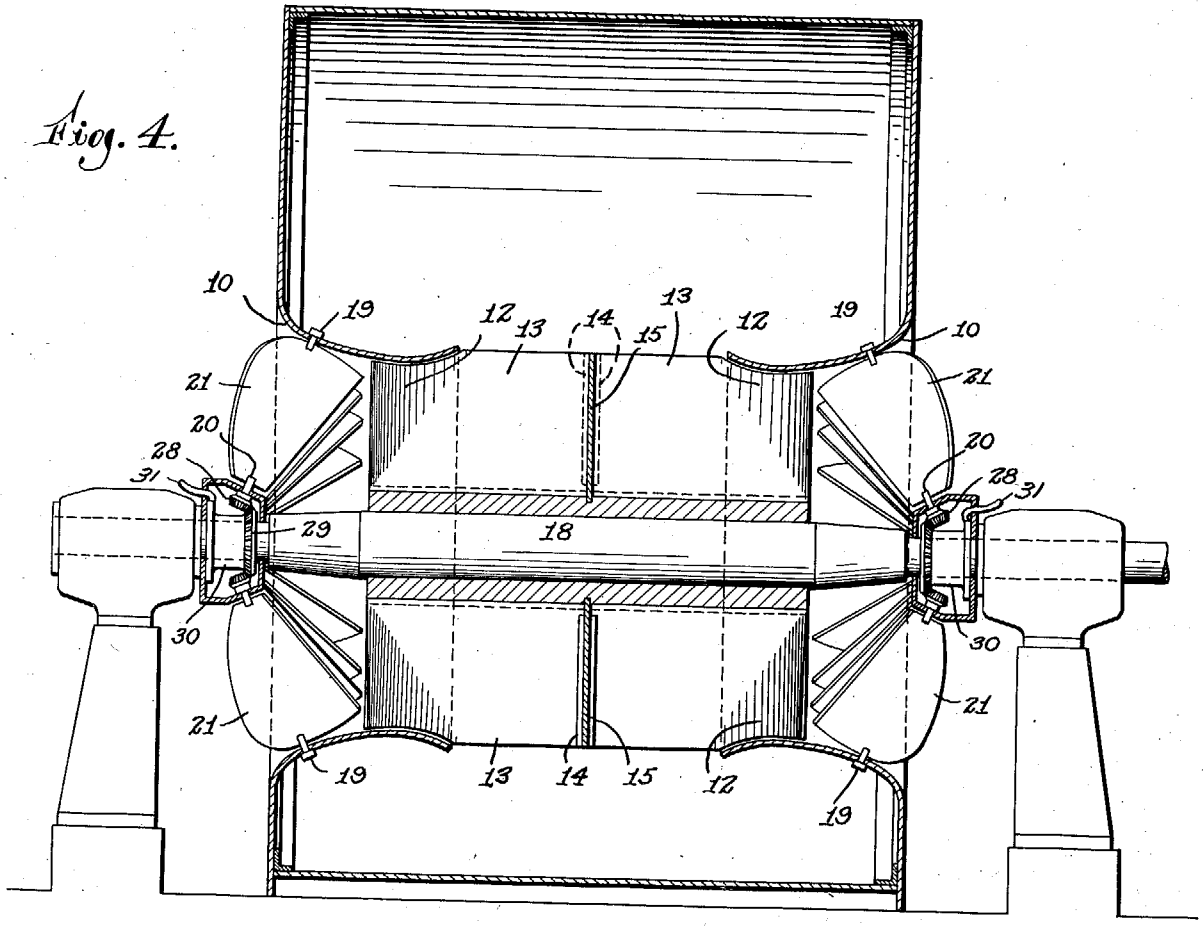
Fig. 4 is a side sectional view of a fan showing another preferred form of inlet passage.
Figure 7:
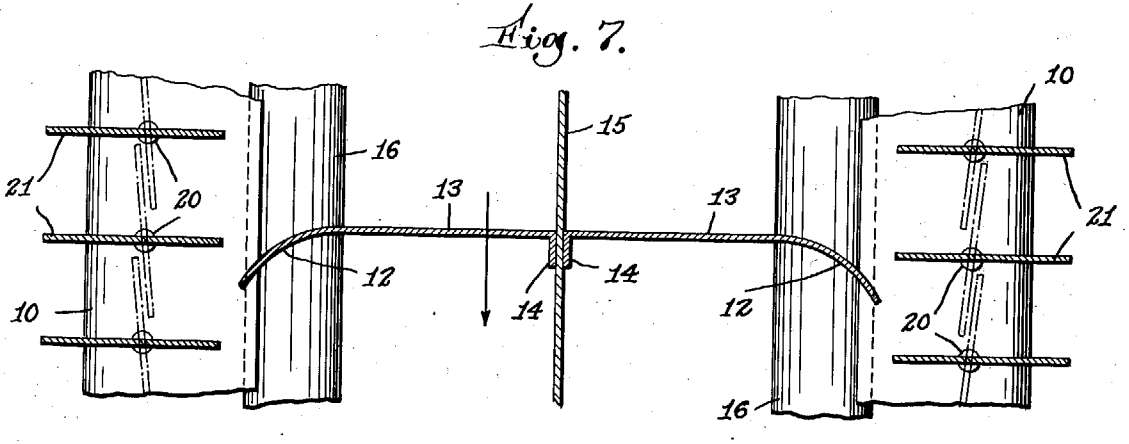
Figure 8:
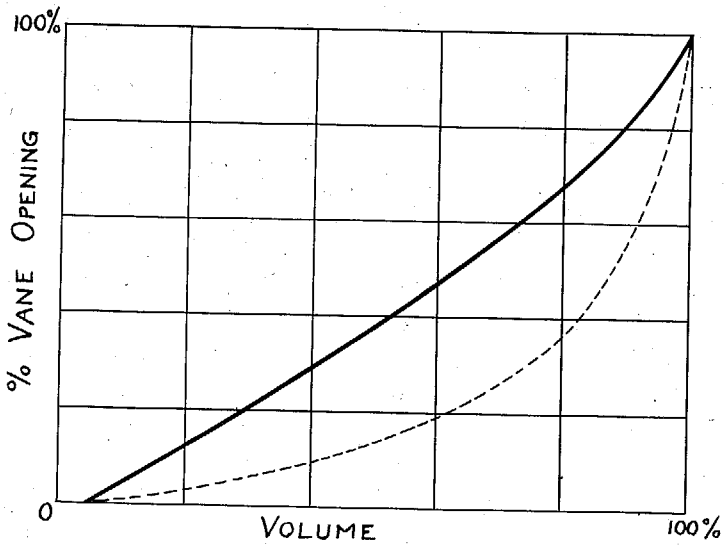

Fig. 7 is a view looking downwardly upon a portion of the fan wheel and controls of either Figs. 1, 3, or 4 and illustrates the arrangement of the vane controls with respect to the curved inlet portions and main working portions of the fan blades, and Fig. 8 is a chart illustrating the relation between the performance of an arrangement utilizing this invention and the performance of the prior arrangements.

Referring now to Fig. 1, the converging inlet sheets 10, terminate at their inner ends within the recesses 11 in the tips of the inlet portions 12 of the blades. The blades as shown by Fig. 2 have curved inlet portions 12 and flat radial, working portions 13 and are adapted to have the angled portions 14 welded to the back plate 15 (Fig. 1) of the wheel.

The stream-lined shrouds 16 are placed over the tips of the curved inlet portions 12 of the blades as shown more clearly by Figs. 5 and 7 and extend over the recessed portions 11. The entering air is guided by the inlet sheets 10 and shrouds 16 in potential flow to the periphery of the fan, providing an inlet radius equal substantially to the discharge radius.

Mounted within each of the converging inlets and attached to the inlet sheets 10 by the outer pivot pins 19, and the member 17 surrounding the shaft 18 by the inner pivot pins 20, are the plurality of vanes 21. The vanes 21 are adapted to be rotated about the pins 19 and 20 by the gears 22 which are actuated by the lever 23, attached to the links 24 (Fig. 6). The link mechanism 25 is used to interconnect the vane adjusting mechanism in one inlet with similar mechanism in the other inlet so that both may be adjusted simultaneously.

The vanes 21 on each side of the fan wheel are connected together by means of the links 26 (Fig. 6), the lost motion being taken up by the spring 27. The vanes on both sides of the wheel may be adjusted simultaneously from the full open positions shown by the full lines of Fig. 7 through an angle of substantially 90° to a nearly closed position as shown by the dotted lines of Fig. 7.

The vanes are so arranged that in their full open position they have no effect upon the flow of the air into the fan. As they are adjusted towards a closed position, they act to vary the angle of entrance of the inflowing air, causing it to take on a spin in the direction of rotation of the wheel. When the vanes are nearly closed, the spin velocity of the entering air is not greatly different from that of the rotating fan wheel with the result that the wheel has little work to do and its output volume is small.

In the previous designs, it was possible to adjust the volume of output from maximum to a low minimum by vane adjustment but the degree of vane adjustment was not sufficiently equally proportional to the volume of output, at constant fan speed, nor was the power required for rotation of the fan sufficiently equally proportional to the degree of vane adjustment. In the foregoing with reference to the formula, it has been explained that more equally proportional adjustment could be obtained by making the inlet radius of the wheel equal, substantially, to the delivery radius and it has been shown how this has been done.

The formula also shows the desirability of decreasing the difference between the spin component of the air delivered onto the blades and delivered by the blades. This is also accomplished according to this invention by providing the inlet edges of the blades with curved portions 12, as shown by Figs. 2, 3, 4 and 7, which extend into the area of the adjustable vanes to a point just short of the inner edges of the vanes 21 when in wide open position. The curved portions 12 as shown more clearly by Fig. 7 are so shaped as to aid the action of the vanes 21 as they are adjusted towards closed position in increasing the spin of the air delivered onto the radial substantially flat working portions 13 of the blades. The curved inlet portions 12 are designed as auxiliary to the working surfaces 13 for the purposes of increasing the spin velocity of the air to be moved by the main working surfaces, and for directing the entering air in potential flow onto the main working surfaces, thereby extending the effective range of adjustment of the vane controls and the overall efficiency of the fan.

The inlet portions 12 are curved or rather warped as shown by Fig. 2, in that they curve from substantially no curvature at the shaft line to a substantial degree of curvature at the tip with no portion of the curve at any point forming an arc of a circle, there thus being no center line for the curved portion to bend about when rotated at high speeds when great centrifugal forces are present. Another characteristic of each preferred inlet portion 12 is that every element extends in lines radiating from the center line of the shaft as every element of each flat working surface 13 does, thus minimizing centrifugal strains and adding to the effectiveness of the curved inlet portion in directing air onto the working portion for equally and fully loading same.

Another beneficial effect of having the curved inlet portions of the blades extend into the area of the vanes so as to terminate just short of their inner portions, is that the entering air to which a spin has been imparted by the vanes, is immediately picked up by the curved inlet portions and guided into the air wheel, with the result that there is no available space in which eddy currents in the spinning air may develop.

In the prior arrangements for vane control utilizing flat blades without curved inlet portions, the inlet portions of the blades terminated a considerable distance from the zone of the control vanes with the result that the air leaving the inner portions of the vanes had considerable space in which to develop turbulent flow, this causing a decrease in the spin velocity of the air entering the fan wheel and a decrease in the range and effectiveness of control and the efficiency of fan operation. With reference to Fig. 3, the vertical dotted lines illustrate the position of the inlet edges of the blades of the prior arrangements. It is seen that the curved inlet portions of the blades according to this invention, not only provide non-eddying air flow between the vanes and the wheel but also increase the spin velocity of the air leaving the control vanes.

Referring now back to the formula which represents the desired conditions of control, it is seen that every desirable factor is provided for, according to this invention. The inlet radius and delivery radius of the wheel are substantially equal. The difference between the spin component of the air entering the working portion of the blades and that at the delivery edges is rduced, as the vanes are adjusted to spin producing positions, by the provision of the curved inlet portions. These factors combine to provide a smaller head for each adjustment of the vanes towards closed position and a resulting greater range of heads between wide open and fully closed position as well as a more nearly equally proportional degree of control as shown clearly by Fig. 7.

Preferred embodiments of the invention are illustrated by Figs. 3 and 4. As shown by Fig. 3, the converging inlet sheet 10 is not only a continuation of the fan casing but it is stream-lined to cooperate with the stream-lined shroud 16 to form one substantially continuous stream-lined deflector for directing the inlet air into the fan wheel and also forms an effective Venturi passage for the delivery of air into the wheel. This arrangement not only provides smoother air flow and increased efficiency but enables the inlet portions of the blades to be placed nearer the control vanes. In Figs. 1 and 3, the inlet casing 10 terminates within the recessed portions 11 below the shroud 16 to prevent the entry of air between the inlet passage and the space above the shroud and recirculation.

As shown by Fig. 4 the inlet sheet 10 extends into the area occupied by the shroud 16 of Fig. 3 and performs the function of the shroud as well as forming the Venturi stream-lined passage.

It was previously thought necessary for maximum results with the control vanes that they be placed in a conical inlet with their outer edges flush with the inner edges of the conical inlet as shown by Fig. 1. It was found, however, that the stream lined arrangement of Fig. 3 gave better results. More air was handled, the fan was more efficient and the effectiveness of the vanes increased.

The vanes 21 of Fig. 3 are adjusted by means of the gears 28 mounted on the inner pins 20. The gears 28 are rotated by the gears 29 which are mounted on the hub members 30 surrounding the shaft 18. The hub members 30 are rotated by the levers 31 which may be interconnected by mechanism which is not illustrated but which may be similar in nature to the levers 24 and the link mechanism 25 illustrated by Fig. 6, in order that the vanes in both inlets of the fan may be adjusted simultaneously.

While the invention has been described in connection with a two inlet fan, obviously, the same principles apply to a single inlet fan.

While one or more embodiments of the invention have been described for the purposes of illustration, it should be understood that the invention is not limited to the exact arrangement described, since many departures may be made by those skilled in the art, after having had access to this disclosure.

What is claimed is:

1. A centrifugal fan adapted to be rotated at a substantially constant speed comprising a fan wheel, means forming a venturi shaped inlet passage leading to said wheel and having an outer diameter substantially greater than and having an inner diameter substantially equal to that of said wheel, a plurality of adjustable spin inducing vanes in said passage, pivoted on axes which are oblique to the axis of said wheel and which extend crosswise the gas stream entering said passage, and means for adjusting said vanes through a range of adjustment, throughout which range said vanes impart a spin to the gas entering said wheel which is dependent upon the degree of adjustment, said wheel having a plurality of fan blades with propeller type curved inlet portions which extend to points immediately adjacent the output edges of said vanes so as to cooperate with said vanes to increase the spin imparted by said vanes to the gas entering said wheel.

2. A centrifugal fan adapted to be rotated at a substantially constant speed comprising a fan wheel, a converging inlet passage leading to said wheel, and having at its outer extremity a substantially greater diameter than the diameter of said wheel and having at its inner extremity a diameter substantially equal to the diameter of said wheel, a plurality of adjustable spin inducing vanes in said passage pivoted on axes which are oblique to the axis of said wheel and which extend crosswise the gas stream entering said passage, and means for adjusting said vanes through a range of adjustment, throughout which range said vanes impart a spin to the gas entering said wheel which is dependent upon the degree of adjustment, said wheel having a plurality of fan blades with propeller type curved inlet portions which extend to points immediately adjacent the output edges of said vanes so as to cooperate with said vanes to increase the spin imparted by said vanes to the gas entering said wheel.

3. A centrifugal fan adapted to be rotated at a substantially constant speed comprising a fan wheel, a substantially streamlined venturi shaped inlet passage leading to said wheel, and having at its outer extremity a substantially greater diameter than the diameter of said wheel and having at its inner extremity a diameter substantially equal to the diameter of said wheel, a plurality of adjustable spin inducing vanes in said passage pivoted on axes which are oblique to the axis of said wheel and which extend crosswise the gas stream entering said passage, and means for adjusting said vanes through a range of adjustment, throughout which range said vanes impart a spin to the gas entering said wheel which is dependent upon the degree of adjustment, said wheel having a plurality of fan blades with propeller type curved inlet portions which extend to points immediately adjacent the output side of said vanes so as to cooperate with said vanes to increase the spin imparted by said vanes to the gas entering said wheel.

4. A centrifugal fan comprising a plurality of blades having propeller type curved inlet portions with recessed tips, walls forming a substantially streamlined inlet passage having at its outer extremity a substantially greater diameter than the diameter of said blades and having at its inner extremity a diameter substantially equal to the diameter of said blades, the innermost portions of said walls extending into said recessed tips to form a shroud for said curved inlet portions, a plurality of adjustable spin inducing vanes in said passage, pivoted on axes which are oblique to the axes of said blades, and which extend crosswise the gas stream entering said passage, and means for adjusting said vanes through a range of adjustment, throughout which range said vanes impart a spin to the gas entering said wheel which is dependent upon the degree of adjustment, said inlet portions extending to points adjacent the output edges of said vanes and being so shaped as to cooperate with said vanes to increase the spin imparted by said vanes to the gas entering said blades.

5. A centrifugal fan comprising a plurality of blades having substantially flat main working portions and propeller type curved inlet portions with recessed tips, said main working portions and said inlet portions having substantially the same diameter, a casing, means forming a venturi shaped inlet passage having an outer diameter substantially greater than and an inner diameter substantially equal to that of said wheel, said inlet passage extending into said casing and within said recessed tips of said curved portions of said blades for guiding the air onto said main working portions of said blades, a plurality of adjustable spin inducing vanes in said passage, pivoted on axes which are oblique to the axes of said blades, and which extend crosswise the gas stream entering said passage, and means for adjusting said vanes through a range of adjustment, throughout which range said vanes impart a spin to the gas entering said wheel which is dependent upon the degree of adjustment, said inlet portions so extending to points immediately adjacent the output edges of said vanes and being so shaped as to cooperate with said vanes to increase the spin imparted by said vanes to the gas entering said main working portions of said blades.

HAROLD F. HAGEN.